US010596596B2

(12) United States Patent
Ling et al.

(10) Patent No.: US 10,596,596 B2
(45) Date of Patent: Mar. 24, 2020

(54) VIBRATION DEVICE AND ELECTRONIC DEVICE INCLUDING THE SAME

(71) Applicant: AAC Technologies Pte, Ltd., Singapore (SG)

(72) Inventors: Fanghua Ling, Shenzhen (CN); Wenli Wang, Shenzhen (CN); Xiang Xu, Shenzhen (CN); Shuming Wang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 233 days.

(21) Appl. No.: 15/658,890

(22) Filed: Jul. 25, 2017

(65) Prior Publication Data

US 2018/0297075 A1 Oct. 18, 2018

(30) Foreign Application Priority Data

Apr. 14, 2017 (CN) .................... 2017 2 0398020 U

(51) Int. Cl.
*B06B 1/04* (2006.01)
*H02K 33/00* (2006.01)
*H02K 33/16* (2006.01)

(52) U.S. Cl.
CPC .............. *B06B 1/045* (2013.01); *H02K 33/00* (2013.01); *H02K 33/16* (2013.01)

(58) Field of Classification Search
CPC ......... B06B 1/045; H02K 33/16; H02K 33/00
USPC .................................................. 310/25, 15
See application file for complete search history.

(56) References Cited

U.S. PATENT DOCUMENTS

| 7,755,227 | B2* | 7/2010 | Hirashima | H02K 33/16 310/36 |
| 8,258,657 | B2* | 9/2012 | Kim | H02K 15/02 310/28 |
| 2011/0115310 | A1* | 5/2011 | Dong | H02K 33/16 310/28 |
| 2011/0115311 | A1* | 5/2011 | Dong | H02K 33/16 310/28 |
| 2011/0181131 | A1* | 7/2011 | Pu | H02K 33/16 310/28 |
| 2011/0280433 | A1* | 11/2011 | Park | H02K 33/16 381/433 |
| 2011/0316361 | A1* | 12/2011 | Park | H02K 33/16 310/25 |

(Continued)

*Primary Examiner* — Alex W Mok
(74) *Attorney, Agent, or Firm* — IPro, PLLC; Na Xu

(57) ABSTRACT

A vibration device, including a housing having accommodating space, a vibrator, a stator and an elastic member, the elastic member is configured to suspend the vibrator in the accommodating space; the vibrator, the stator and the elastic member are accommodated in the housing, the elastic member includes two elastic plate components disposed at two opposite sides of the vibrator, each elastic plate component includes at least two V-shaped elastic plates parallelly arranged perpendicular to vibrating direction, each elastic plate component includes a first fixing portion fixedly connected with the housing, a second fixing portion fixedly connected with the vibrator, and a V-shaped elastic arm connecting the first fixing portion with the second fixing portion, the first and second fixing portions are opposite to and spaced from each other to form an opening end, and the opening ends of two V-shaped elastic plates faces away from each other.

10 Claims, 4 Drawing Sheets

(56) References Cited

U.S. PATENT DOCUMENTS

| | | | | |
|---|---|---|---|---|
| 2012/0049660 A1* | 3/2012 | Park | ................ | B06B 1/045 |
| | | | | 310/25 |
| 2012/0112565 A1* | 5/2012 | Lee | ................ | B06B 1/045 |
| | | | | 310/20 |
| 2012/0153748 A1* | 6/2012 | Wauke | ................ | H02K 33/16 |
| | | | | 310/25 |
| 2012/0169148 A1* | 7/2012 | Kim | ................ | H02K 33/16 |
| | | | | 310/25 |
| 2012/0169151 A1* | 7/2012 | Dong | ................ | H02K 33/16 |
| | | | | 310/25 |
| 2012/0170792 A1* | 7/2012 | Li | ................ | H02K 33/16 |
| | | | | 381/412 |
| 2012/0187780 A1* | 7/2012 | Bang | ................ | H02K 33/16 |
| | | | | 310/25 |
| 2012/0293022 A1* | 11/2012 | Park | ................ | B06B 1/045 |
| | | | | 310/25 |
| 2013/0099600 A1* | 4/2013 | Park | ................ | B06B 1/045 |
| | | | | 310/15 |
| 2013/0099602 A1* | 4/2013 | Park | ................ | H02K 33/16 |
| | | | | 310/25 |
| 2013/0201127 A1* | 8/2013 | Abe | ................ | G06F 3/016 |
| | | | | 345/173 |
| 2013/0259290 A1* | 10/2013 | Yan | ................ | H04R 9/025 |
| | | | | 381/412 |
| 2015/0188398 A1* | 7/2015 | Zhang | ................ | H04R 9/02 |
| | | | | 310/28 |
| 2016/0013710 A1* | 1/2016 | Dong | ................ | H02K 33/16 |
| | | | | 310/25 |
| 2016/0204685 A1* | 7/2016 | Mori | ................ | H02K 33/00 |
| | | | | 310/25 |

* cited by examiner

VIBRATION DEVICE AND ELECTRONIC DEVICE INCLUDING THE SAME

TECHNICAL FIELD

The present disclosure relates to the field of electronic devices and, particularly, to a vibration device and an electronic device including the vibration device.

BACKGROUND

With the development of electronic technologies, portable consuming electronic products such as cellphones, handheld game players, navigation devices or handheld multimedia entertainment devices and the like are becoming more and more popular. These electronic products usually use a vibration device for a system feedback such as call prompt, message prompt, the navigation prompt of cellphones, or the vibration feedback of game players, etc.

The existing vibration device includes a housing having accommodating space, a vibrator, a stator accommodated in the housing, and a spring configured to suspend the vibrator in the accommodating space. The existing spring is of an S-shaped structure, two ends of the S-shaped spring are respectively welded on the vibrator and the housing. The elastic deformation direction of the spring is the same as the vibrating direction of the vibrator. In the vibration device having such a structure, high accuracy is required for the spring and the processing of the spring is difficult, moreover, the, the welding area between the vibrator and the spring is not easily formed, which brings difficulty during assembling.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

In order to make the purpose, technical solution and advantage of the present disclosure more clearly, the embodiments of the present disclosure will be described in detail with reference to the accompanying drawings. It shall be understood by those skilled in the art that, in various embodiments of the present disclosure, a plurality of technical details have been presented in order to help readers to better understand the present disclosure. However, even without these technical details or any variations or modifications based on the following embodiments, the technical solution protected by the claims of the present disclosure can still be implemented.

Figure 1:
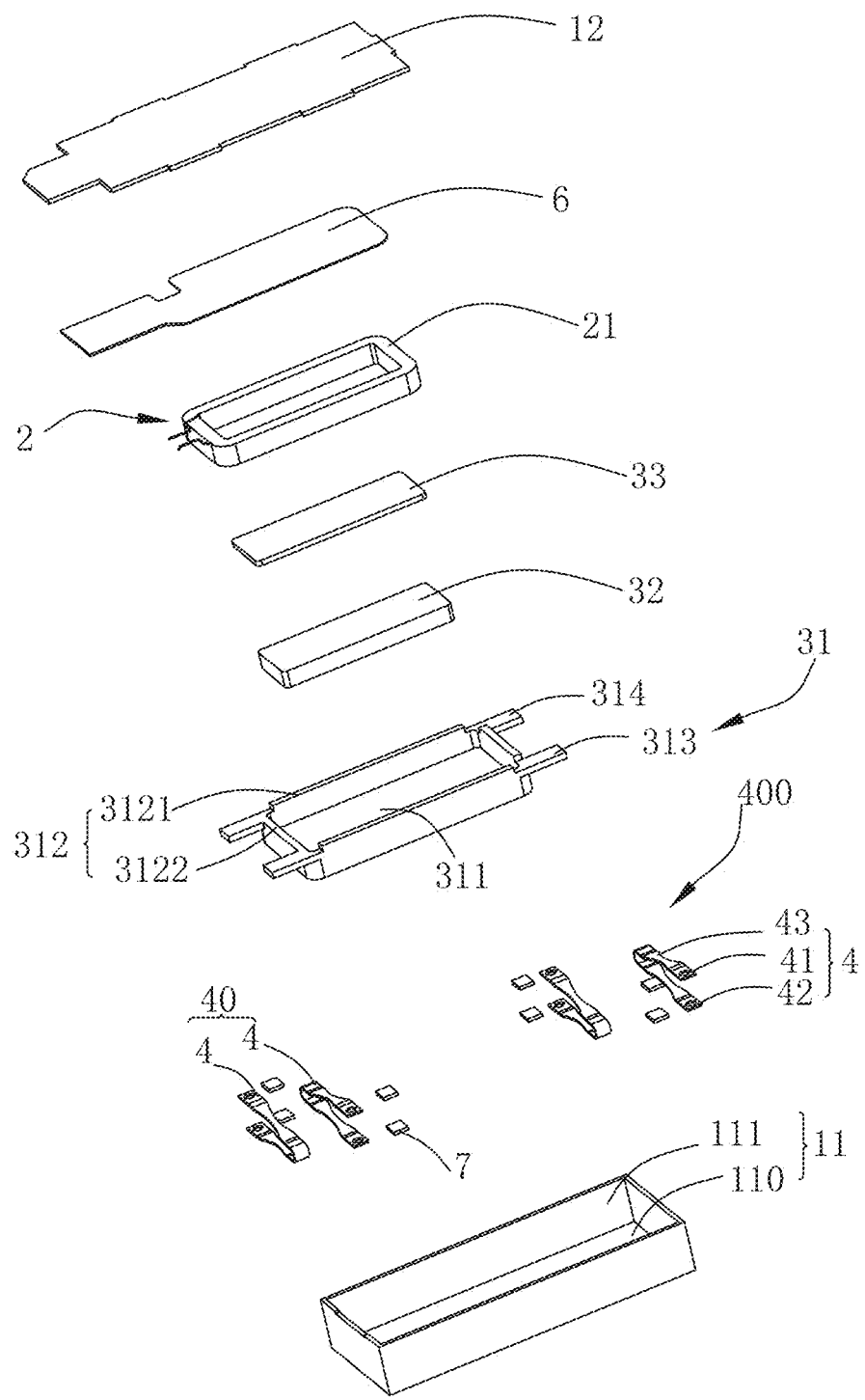
FIG. 1 is an exploded structural schematic view of a vibration device in accordance with an exemplary embodiment of the present disclosure.
Figure 2:
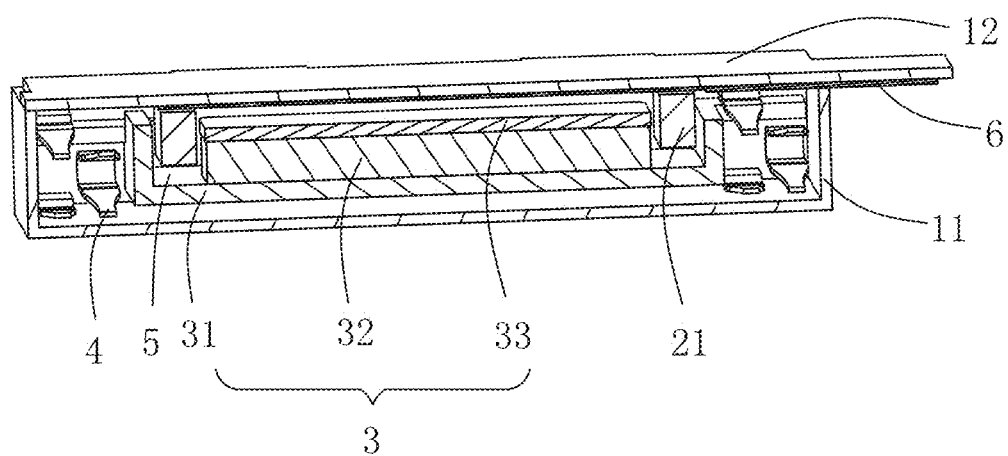
FIG. 2 is a sectional view of an assembled structure of a vibration device in accordance with an exemplary embodiment of the present disclosure.

The present disclosure provides a vibration device, as shown in FIGS. 1-2, including a housing 1 having accommodating space, a stator 2, a vibrator 3 and an elastic member 400. The elastic member 400 is configured to suspend the vibrator 3 in the accommodating space. The stator 2, the vibrator 3 and the elastic member 400 are all accommodated in the housing 1.

The housing 1 includes an upper cover plate 11 and a lower cover plate 12 connected with the upper cover plate 11. The upper cover plate 11 further includes an upper bottom plate 110 and a surrounding side wall 111 extending from the upper bottom plate 110 in a direction to the lower cover plate 12. The vibrator 3 is suspended in the housing 1 by the elastic member 400 and vibrates in a direction perpendicular to the upper bottom plate 110.

In an exemplary embodiment, the stator 2 includes a coil 21 fixed on the lower cover plate 12, a printed circuit board (Printed Circuit Board, PCB) 6 is provided between the coil 21 and the lower cover plate 12, and the coil 21 is electrically connected with the PCB 6. The vibrator 3 includes a magnetic circuit unit. The magnetic circuit unit includes a magnetic conductor 31 having containing space, a main magnet 32 disposed in the magnetic conductor 31, and a pole plate 33 attached to the main magnet 32. The coil 21 is arranged around and spaced from the main magnet 32. Obviously, the structure of the vibrator 3 is not limited to the above-described combination of components, it should be understood that, any component that moves reciprocally in the housing 1 by the electromagnetic induction force between the coil 21 and the main magnet 32 can be regarded as the vibrator 3.

It should be noted that, the role of the coil 21 and the role of the main magnet 32 can be interchanged, the coil 21 is the vibrator 3 while the main magnet 32 is the stator 2, and the main magnet 32 is fixed on the lower cover plate 12, a technician can make a selection based on specific demands, which will not be illustrated in detail herein.

Specifically, the magnetic conductor 31 includes a bottom wall 311 and a side wall 312 bending and extending along the bottom wall 311. The bottom wall 311 and the side wall 312 together form the containing space. The main magnet 32 is fixed on the bottom wall 311, and the main magnet 32 is spaced from the side wall 312 to form a magnetic gap 5. The coil 21 is inserted into the magnetic gap 5, and a first fixing portion 41 is connected with the magnetic conductor 31.

The side wall 312 includes a pair of first side walls 3121 symmetrically arranged along a short axis direction Y of the magnetic conductor 31, and a pair of second side walls 3122 symmetrically arranged along a long axis direction X of the magnetic conductor 31. The first side wall 3121 is connected with the second side wall 3122.

More specifically, the second side wall 3122 is provided with a first protruding portion 313 and a second protruding portion 314 which extend to the upper cover plate 11. The first protruding portion 313 and the second protruding portion 314 extend in the short axis direction Y of the magnetic conductor 31, and the first protruding portion 313 and the second protruding portion 314 are arranged parallel to and spaced from each other.

The elastic member 400 includes two elastic plate components 40 disposed on two opposite sides of the vibrator 3. In an exemplary embodiment, each elastic plate component 40 includes two V-shaped elastic plates 4 arranged parallel to each other and perpendicular to the vibrating direction. Each elastic plate 4 includes a first fixing portion 41 fixedly connected with the upper bottom plate 110, and a second fixing portion 42 fixedly connected with the vibrator 3, and a V-shaped elastic arm 43 connecting the first fixing portion 41 with the second fixing portion 42. The first fixing portion 41 and the second fixing portion 42 are opposite to and spaced from each other to form an opening end. The opening ends of the two V-shaped elastic plates 4 are arranged in opposite directions. In the present embodiment, the V-shaped elastic plates 4 are arranged parallel to each other in the long axis direction X.

From the above contents, it is clear that, since the elastic plate component 40 is set to be two V-shaped elastic plates 4 arranged parallel to each other in the direction perpendicular to the vibrating direction of the vibrator 3, the V-shaped elastic plate 4 has a simple structure, which is easily to be shaped and processed, and can be directly formed by bending of a spring. In addition, in a specific assembling process the opening extent of the opening end of the V-shaped elastic plate 4 can be adjusted optionally without requirements on high precision, thereby simplifying the assembling difficulty. In addition, the V-shaped elastic plate 4 can also be formed in other manners other than bending, the technician can select a specific processing manner based on specific processing demands, which will not be illustrated in detail herein.

Specifically, the V-shaped elastic arm 43 includes a second oblique arm 432 obliquely extending from the second fixing portion 42, a first oblique arm 431 obliquely extending from the first fixing portion 41, and an arc arm 433 connecting the first oblique arm 431 with the second oblique arm 432. The first oblique arm 431 and the second oblique arm 432 obliquely extend in the direction close to each other. It should be understood that, the arc arm 433 can be configured as a circular arc arm or an elliptic arc, the technician can make a selection based on specific demands, which will not be illustrated in detail herein. Moreover, the radian of the arc arm 433 can be adjusted based on specific processing demands, so that the spring 4 can be easily processed.

Figure 3:
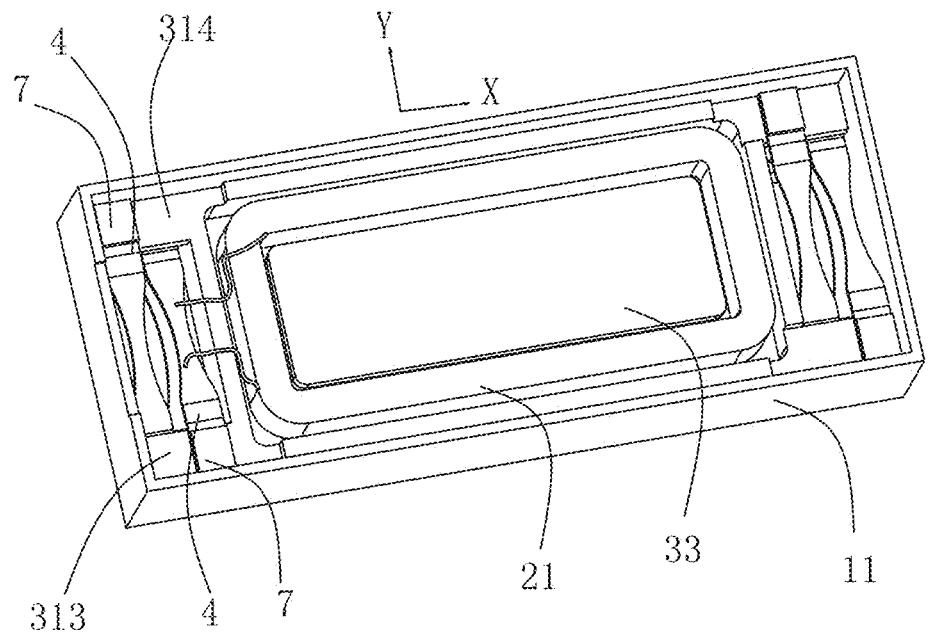
FIG. 3 is a structural schematic view of a vibration device being partially assembled in accordance with an exemplary embodiment of the present disclosure.
Figure 4:
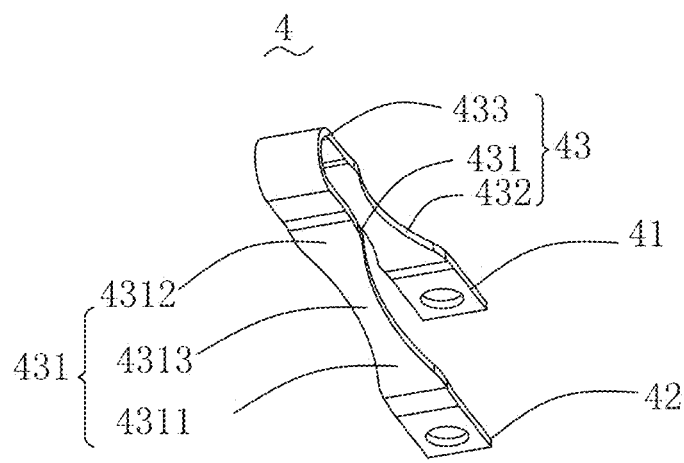
FIG. 4 is a perspective structural schematic view of a V-shaped elastic plate in accordance with an exemplary embodiment of the present disclosure.
Figure 5:
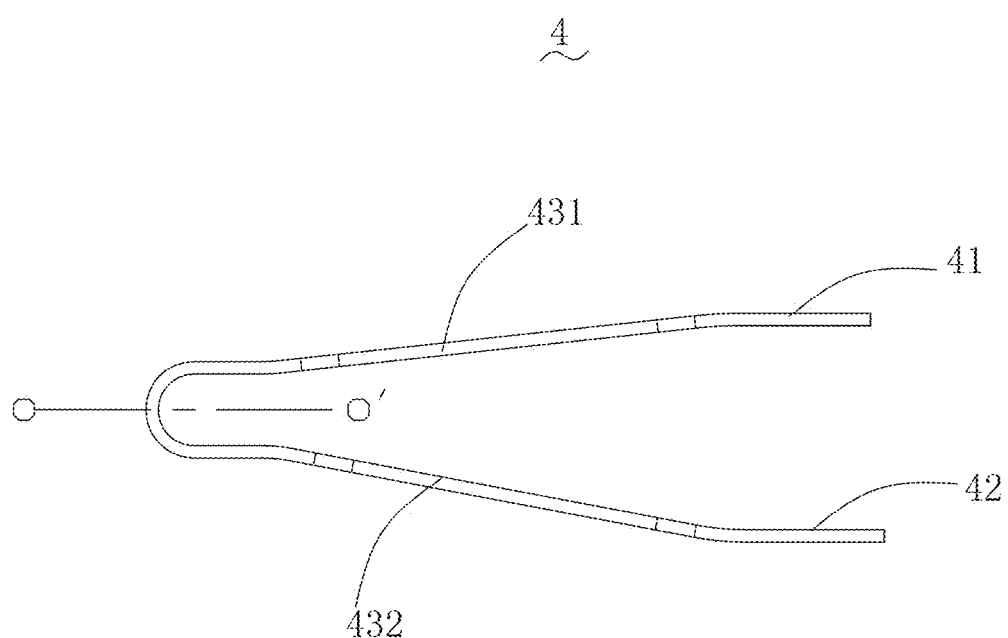
FIG. 5 is a top view of the V-shaped elastic plate shown in FIG. 4.

With reference to FIG. 3 and FIG. 4, in an exemplary embodiment, the arc arm 433 has a central axis OO'. The first oblique arm 431 and the second oblique arm 432 are symmetrical with respect to the central axis OO'. In this way, with the symmetrical structure of the V-shaped elastic plate 4, the vibration stability of the vibrator 3 can be improved.

On the other hand, the first oblique arm 431 includes a first portion 4311 connected with the first fixing portion 41, a second portion 4312 connected with the arc arm 433, and a third portion 4313 connecting the first portion 4311 with the second portion 4312. The width of the first portion 4311 and the width of the second portion 4312 is greater than the width of the third portion 4313. The width refers to the length of each portion along the long axis direction X. Preferably, the second oblique arm 432 has the same structure with the first oblique arm 431.

After assembling, the second fixing portion 42 of one V-shaped elastic plate 4 of the elastic plate component 40 is fixed on the first protruding portion 313, and the second fixing portion 42 of another V-shaped elastic plate 4 is welded on the second protruding portion 314. In this way, the connecting points of the V-shaped elastic plate 4 and the magnetic conductor 31 are symmetrically distributed on both sides of the magnetic conductor 31, so that the force applied to magnetic conductor by the V-shaped elastic plate 4 is symmetrically distributed on both sides of the magnetic conductor 31, thereby allowing vibration of the vibrator 3 to be stable and reliable.

On the other hand, in an exemplary embodiment, the first fixing portion 41 is welded on the upper cover plate 11.

It should be noted that, in order to further improve the welding effect between the second fixing portion 42 and the first protruding portion 313, between the second fixing portion 42 and the second protruding portion 314, and between the first fixing portion 41 and the upper cover plate 11, in an exemplary embodiment, the included angle between the second fixing portion 42 and the second oblique arm 432 is an obtuse angle, and the included angle between the first fixing portion 41 and the first oblique arm 431 is also an obtuse angle. In this way, in the welding process, the welding surfaces between the second fixing portion 42 and the first protruding portion 313, between the second fixing portion 42 and the second protruding portion 314, and between the first fixing portion 41 and the upper cover plate 11 can be better fitting, which facilitates the welding and, as a result, improves the welding effect.

In order to further improve the fastness of the connection, the vibration device further includes a pad 7. The pad 7 is installed on a plane facing away from the plane where the first fixing portion 41 is connected with the upper cover plate 11, and the pad 7 is also installed on a plane facing away from the plane where the second fixing portion 42 is connected with the upper vibrator 3.

The present disclosure also includes an electronic device, including the vibration device described in the first embodiment.

From the above contents, it is clear that, since the entire electronic device includes the elastic plate component 40, which is configured to be two V-shaped elastic plates 4 arranged parallel to each other in the direction perpendicular to the vibrating direction of the vibrator 3, the V-shaped elastic plate 4 has a simple structure, which is easily shaped and processed, and can be directly formed by bending of a spring. In addition, in a specific assembling process, the opening extent of the opening end of the V-shaped elastic plate 4 can be adjusted optionally without requirements on high precision, thereby simplifying the assembling difficulty. Moreover, the V-shaped elastic plate 4 can also be formed in other manners other than cold bending, the technician can select a specific processing manner based on specific processing demands, which will not be illustrated in detail herein.

Those skilled in the art shall understand that, the above embodiments are examples for implementing the present disclosure, in practical application, various modifications can be made without departing from the spirit and scope of the present disclosure.

What is claimed is:

1. A vibration device, comprising:
    a housing having accommodating space,
    a vibrator accommodated in the accommodating space,
    a stator accommodated in the accommodating space, and
    an elastic member, the elastic member is configured to suspend the vibrator in the accommodating space,
    wherein the elastic member comprises two elastic plate components disposed at two opposite sides of the vibrator, one of the vibrator and the stator comprises a magnetic circuit unit, and the other one of the vibrator and the stator comprises a coil,
    wherein each elastic plate component comprises at least two V-shaped elastic plates arranged parallel to each other in a direction perpendicular to the vibrating direction, and each V-shaped elastic plate comprises a first fixing portion fixedly connected with the housing, a second fixing portion fixedly connected with the vibrator, and a V-shaped elastic arm connecting the first fixing portion with the second fixing portion, the first fixing portion and the second fixing portion are arranged opposite to and spaced from each other to form an opening end, and the opening ends of the two V-shaped elastic plates are arranged toward opposite directions;

wherein a deformation path of each V-shaped elastic plate is out of a vibration path of the vibrator, and a deformation state of each V-shaped elastic plate is consistent.

2. The vibration device as described in claim 1, wherein The V-shaped elastic arm comprises a second oblique arm obliquely extending from the second fixing portion, a first oblique arm obliquely extending from the first fixing portion, and an arc arm connecting the first oblique arm with the second oblique arm, the first oblique arm and the second oblique arm obliquely extend in a direction close to each other.

3. The vibration device as described in claim 2, wherein the first oblique arm and the second oblique arm are symmetrically arranged with respect to a central axis of the arc arm.

4. The vibration device as described in claim 2, wherein the first oblique arm and the second oblique arm respectively comprises a first portion connected with the first fixing portion, a second portion connected with the arc arm, and a third portion connecting the first portion with the second portion, a width of the first portion is greater than a width of the third portion, and a width of the second portion is also greater than the width of the third portion.

5. The vibration device as described in claim 2, wherein an included angle between the second fixing portion and the second oblique arm is an obtuse angle, and an included angle between the first fixing portion and the first oblique arm is also an obtuse angle.

6. The vibration device as described in claim 1, wherein the magnetic circuit unit comprises a magnetic conductor having containing space, and a main magnet disposed in the magnetic conductor, the coil is arranged by winding the main magnet.

7. The vibration device as described in claim 6, wherein the magnetic conductor comprises a bottom wall and a side wall, the side wall bends and extends from the bottom wall, the bottom wall and the side wall together form the containing space, the main magnet is fixed on the bottom wall, and the main magnet is spaced from the side wall to form a magnetic gap, the coil is inserted into the magnetic gap, and the first fixing portion is connected with the magnetic conductor.

8. The vibration device as described in claim 7, wherein the side wall comprises a pair of first side walls symmetrically arranged along a short axis direction of the magnetic conductor, and a pair of second side walls symmetrically arranged along a long axis direction of the magnetic conductor, the pair of first side walls is connected with the pair of second side walls, the two elastic plate components are respectively connected with the pair of second side walls.

9. The vibration device as described in claim 8, wherein the second side wall is provided with a first protruding portion and a second protruding portion, the first protruding portion and the second protruding portion extend to the housing and are arranged parallel to and spaced from each other along the short axis direction of the magnetic conductor, a second fixing portion of one of the V-shaped elastic plates of the elastic plate components is fixed with the first protruding portion, and a second fixing portion of the other one of the V-shaped elastic plates is fixed with the second protruding portion.

10. An electronic device, comprising the vibration device as described in claim 1.

* * * * *